(12) United States Patent  
Howes

(10) Patent No.: US 6,959,284 B1
(45) Date of Patent: Oct. 25, 2005

(54) CONTAINERIZED LIQUID COATING PRODUCT SUPPLY BUSINESS METHOD

(75) Inventor: John L. Howes, 19967 Doyle Pl. East, Gross Pointe Woods, MI (US) 48236

(73) Assignee: John L. Howes, Gross Pointe Woods, MI (US)

( * ) Notice: Subject to any disclaimer, the term of this patent is extended or adjusted under 35 U.S.C. 154(b) by 0 days.

(21) Appl. No.: 09/543,764

(22) Filed: Apr. 5, 2000

Related U.S. Application Data

(60) Provisional application No. 60/157,840, filed on Oct. 6, 1999.

(51) Int. Cl.[7] ............................................. G06F 17/60
(52) U.S. Cl. ....................................................... 705/26
(58) Field of Search .............................. 705/26, 27, 20, 705/23, 37, 35; 700/115, 216, 233, 239

(56) References Cited

U.S. PATENT DOCUMENTS

| | | |
|---|---|---|
| 4,887,217 A | 12/1989 | Sherman et al. |
| 4,967,938 A | 11/1990 | Hellenberg |
| 5,083,591 A | 1/1992 | Edwards et al. |
| 5,153,825 A | 10/1992 | Yauk et al. |
| 5,268,849 A | 12/1993 | Howlett et al. |
| 5,371,599 A | 12/1994 | Falcoff et al. |
| 5,463,555 A | 10/1995 | Ward et al. |
| 5,550,746 A | 8/1996 | Jacobs |
| 5,559,173 A | 9/1996 | Campo et al. |
| 5,723,517 A | 3/1998 | Campo et al. |
| 6,358,546 B1 | 3/2002 | Bebiak et al. |
| 6,576,280 B2 | 6/2003 | Bebiak et al. |
| 6,594,642 B1 | 7/2003 | Lemchen |
| 2001/0037255 A1 | 11/2001 | Tambay et al. |
| 2001/0047250 A1 | 11/2001 | Schuller et al. |
| 2001/0049591 A1 | 12/2001 | Brunt et al. |

FOREIGN PATENT DOCUMENTS

| | | |
|---|---|---|
| WO | WO 01/59542 | 8/2001 |
| WO | WO 01/69498 | 9/2001 |

*Primary Examiner*—Jeffrey A. Smith
*Assistant Examiner*—Jaime E. Zurita
(74) *Attorney, Agent, or Firm*—Harness, Dickey & Pierce, P.L.C.

(57) ABSTRACT

A consumer places an order for liquid coating product directly with a supplier via the internet or telecommunications. Customer order information is entered into a customer order subsystem on a computer, is compiled, processed and then utilized by a production subsystem governing a production line for containerized liquid coating product inclusive of all colorants required to obtain particular, non-standard, colors. Batching with regard to liquid coating base, delivery date and geographic delivery address is suggested. Shipping assemblies and packages specific customer orders for commercial transport service directly to the delivery address given by the consumer. Customer order information including verified content is indicated by a container identifier in assurance of quality. Attachment of a label upon each container after filling with blended liquid coating base and colorant with information printed and/or a bar or other digital code is suggested. Superior precision in colorant addition than that obtainable by a local retailer ensures consistent color, tone, and shade for particular, non-standard, colors in diverse containers and orders. Standard containers may be partially filled and non-standard volume plastic containers may also be utilized in fulfillment of precise order quantities. Production to order minimizes inventory. Product information including digital assistance in selection of base, color, and volume for a given-application and placing an order is readily provided on an internet web site or a dedicated terminal in a kiosk.

2 Claims, 5 Drawing Sheets

CONTAINERIZED LIQUID COATING PRODUCT SUPPLY BUSINESS METHOD

REFERENCE TO PRIOR APPLICATION

Benefit of the earlier filing date of Provisional Application No. 60/157,840, filed 6 Oct. 1999 in the name of John L. Howes, is hereby claimed for the instant application for patent which claims the invention disclosed in said provisional application for patent.

BACKGROUND OF THE INVENTION

1. Field of the Invention

The instant invention relates: generally to containerized liquid coatings such as paints, primers, stains, et cetera; more particularly to a business method encompassing the entire process by which such product may be selected, ordered, and obtained by a customer and how orders so placed may be fulfilled; most particularly to such a business method wherein electronic information transfer is facilitated by internet utilization and electronic information is processed in the receipt of an order.

2. General Background

Liquid coatings such as paints, primers, stains, varnishes, et cetera, are considered to be characterized by a diverse constituency including a combination of liquid colorant in addition to a base of appreciable viscosity typically greater than the viscosity of the colorant. It is further considered that for this reason such liquid coatings are ubiquitously contained in rigid cylindrical metal containers, hereinafter referred to as paint cans, possessing large metal lids which require prying off and allow resealing so that colorant may be added by a local retailer and the paint can then be shaken on a machine to attain thorough mixing and fulfillment of the order placed by a customer who typically waits while the addition of colorant and/or mixing of the product is effected. It is important that the colorant be thoroughly mixed with the base and this requires a specialized machine which is specific to mixing the contents of paint cans and which the customer generally lacks.

The cans in which liquid coatings of this type are available are standardized. Generally only gallons, quarts, and less commonly, pints, are utilized for paint cans in the United States. Five gallon plastic pails are also known for use in containerizing liquid coatings such as paint, primer, stains and varnish as well as more viscous materials such as mastic and other adhesive compounds. These five gallon plastic pails are rigid and generally cylindrical, with a slight sidewall draft angle to facilitate molding, and further possess a large top lid which is resealable.

The unit cost of the liquid coating product varies with respect to standard volume purchased. And it is also considered that as colorant is added to the base in the paint can by the retailer there is a considerable margin of error and, in the interest of having precisely the same color paint for a given room, for example, which may only require two quarts of paint, it is generally considered a good idea to buy a full gallon instead because it will all be the same color and there will be no chance that the two different cans will possess an appreciably different color, tone, or shade.

The difference in unit price between standard volumes further encourages purchase of a single can or pail of paint of greater volume than required. Three quarts often exceed the price of a gallon of the same paint and this observation is taken to indicate a certain set of circumstances relating to the manufacture, distribution, and sales of liquid coatings of this type. A certain fixed cost in containerizing and handling a single unit regardless of size is recognized which argues for the use of larger containers as being more economic. It is further recognized that manufacturer, distributor, and retailer all have an economic reason for using as few standard volume containers as possible which is compounded by the fact that a local retailer must mix the liquid coating for the customer.

It is also noted that the distribution system for liquid coating product which may have colorant added by a local retailer necessarily involves shipment of product in paint cans or five gallon plastic pails by the manufacturer to the local retailer. A distributor intermediary to the manufacturer and local retailers may additionally be involved in which case inventory is carried by three parties prior to purchase by a customer. Most importantly, however, the customer must visit a local retailer in order to purchase the can(s) of paint and typically must wait for the paint to be mixed after colorant is added as discussed above. If the customer is a contractor this generally entails a visit to the local retailer prior to driving over to the work site and the trip there and the wait while the paint is made up is time lost. The tendency to purchase more paint than necessary for a given job resulting from the use of standard volumes and the pricing for the same combined with the desire to ensure that all the paint will have the same color, tone, and shade is further encouraged by the desire to avoid a second trip back to get more paint if an insufficient amount was picked up the first time.

DISCUSSION OF THE PRIOR ART

The prior art considered most pertinent to the instant invention is comprised of the web sites or home pages currently accessible on the internet advertising paint product made by different manufacturers including PPG, Sherwin-Williams, and Kelly-Moore. All three sites offer digital assistance in product selection, color selection, calculation of volume required as determined by the size of the surface to be covered, and store selection. The customer can review information regarding the paint base, review color swatches, input dimensions defining the area to be covered, and input an address which will yield the closest retailer to the address inputted. While a comparatively larger number of other types of 'e-commerce' are known, none specifically address liquid coatings such as paint except for the web sites representing paint manufacturers.

With regard to use of digital processing in control of mixing colorant with base to achieve a given color U.S. Pat. No. 4,887,217 issued 12 Dec. 1989 to The Sherwin-Williams Company is considered exemplary of the known prior art. The process disclosed therein utilizes an index for the difference in color between wet and dry conditions which is considered a well known and fundamental impediment to achieving duplication of a particular shade desired. The wet paint may look right to the customer but when dry the shade changes and the result is frequently unsatisfactory. The process disclosed determines correction factors from readings by a spectrophotometer or calorimeter of the wet paint during manufacture using an index for correlating the wet and dry states with regard to color, tone, and shade. The process, however, is "for the manufacture of paint to match the color of a standard paint within a specified color tolerance" (claim 1) and is not applicable to the retailer attempting to duplicate the color on a dry swatch of previously mixed paint.

Other U.S. Patents which cite U.S. Pat. No. 4,887,217 include U.S. Pat. Nos. 5,723,517 & 5,559,173 both entitled 'System For Controlling The Color Of Compounded Polymer(s) Using In-Process Color Measurements', U.S. Pat. No. 5,550,746 for a 'Method And Apparatus for Storing And Selectively Retrieving Product Data By Correlating Customer Selection Criteria With Optimum Product Designs Based on Embedded Expert Judgement', and U.S. Pat. No. 5,371,599 for a 'Rapid Color Shading Process'.

U.S. Pat. No. 5,268,849 for 'Process and Apparatus For Dispensing Liquid Colorants Into A Paint Can, And Quality Control Therefor' also cites U.S. Pat. No. 4,887,217 and concerns the manufacture of paint, not the addition of colorants by a retailer. This patent discloses an "automated paint-batching system" with at least one dispensing station including a scale which measures the weight of the paint can and contents therein during dispensing of either colorant or base. Each paint can further has a "bar-code label" "attached to it" (Abstract) which is correlated to an address in computer memory "which stores the color-formula for that can and other infromation" which is understood to refer to the formula used in making the paint held by the can so identified. Computer processing is further utilized in tracking the paint can through "paint-batching cells of the system" wherein bar codes are read "at a plurality of stations along the entire manufacturing process."

In addition to the use of a bar code and computer memory for tracking paint cans and the paint therein during manufacture, U.S. Pat. No. 5,268,849 further claims a "method of automating the production of paint in paint cans", including the step of "placing an order for a paint can of specified size and paint-color at a remote location" in which it is presumed that the order actually pertains to a specified volume and color of paint held in a paint can (claim 19). Other steps involve "emplacing the bar-code on the empty paint transported" wherein it is assumed that the word 'can' was inadvertently omitted in between "paint" and "transported" and "conveying the empty paint can from said bar-code reader-station to one of a plurality of paint-batching cells" which step is "controlled by said operations-control computer, and comprising choosing said one cell of the plurality of cells to which that empty paint (can) is to be conveyed."

Lastly, with regard to the disclosure of U.S. Pat. No. 5,268,849, the Abstract therefor states that the system is "for producing paint cans of any size and color" wherein, again, it is assumed that the color and production pertains to the paint placed in cans, not to the color or production of the cans. A similar interpretation is applicable to the phrase 'any size and color'. Obviously cans exceeding the size of the manufacturing plant concerned are not feasible and actually 'any size' paint can means any standard size paint can, i.e. gallons, quarts, pints.

Similarly, the phrase 'any color' is understood to mean any standard color for manufacture which is much different than any color as available from a retailer who takes a can of paint of standard color from a manufacturer and customizes the paint with the addition of colorant in accordance with a formula. The difference between the two is considered essential. The manufacturer is only concerned with standard colors which necessarily require further customization to achieve an approximation of the color selected by a customer. The customer for the manufacturer comprises local retailers or distributors intermediary to the manufacturer and the local retailers. The true or final customer, i.e. the consumer, buys from a local retailer who has only a very limited number of standard colors which comprise the base to which colorants are added and mixed in order to obtain any of the hundreds of colors typically comprising the selection available to the consumer.

For the manufacturer of paint the base is comprised of liquid binder and liquid solvent to which colorant is added to achieve a standard color with a given type of base, e.g. water or oil, flat or gloss. For the local retailer the standard color paint available from the manufacturer is effectively a base to which additional colorants must be added in order to achieve approximation of the precise color specified by a customer. The customer typically selects a particular, non-standard, color from swatches provided by the manufacturer through the local retailer who adds colorants in the proportions specified by the manufacturer. But it is considered a misnomer to refer to 'any color' or 'any size can' with regard to manufacture without recognition of actual practice and the constraints imposed by the same whereby standard colors and standard volumes are mandatory.

U.S. Pat. No. 5,083,591 for 'Process and Apparatus For Dispensing Liquid Colorants Into A Paint Can, And Quality Control Therefor' is a divisional result of the application resulting in the patent of the same title discussed at length above which possesses the following as a base claim:

A method for formulating paint by dispensing paint ingredients into a paint can, in an apparatus comprising a first tint-dispensing station storing various liquid colorants for dispensing thereat, and a second base-dispensing station storing liquid base for dispensing thereat, said method comprising:

(a) conveying a paint can to a first tint-dispensing station;

(b) dispensing a prewetting amount of liquid base at the first tint-dispensing station;

(c) after said (b) step, dispensing liquid colorants, one at a time, at said first tint-dispensing station making up the formula of the color of the pint for the paint can;

(d) after said step (c), conveying the partially-filled paint can to a second base-dispensing station;

(e) dispensing the remaining volume of liquid base of the particular formula for the respective paint can at the second base-dispensing station;

(f) thereafter, conveying the paint can from the second base-dispensing station.

U.S. Pat. No. 4,967,938 for 'Paint Dispensing Apparatus' makes a similar disclosure which "comprises a plurality of container assemblies mounted for indexing" by a "dispensing station" which includes apparatus for actuating meters and valves in the assemblies thereby controlling the automatic dispensing of "metered colorants into passing containers (holding) paint base material, according to formulae stored in the apparatus." (Abstract)

U.S. Pat. No. 5,153,825 for 'Paint Formula Retrieval And Management System And Method' "presents a ruled scale representation of actual sizes on a display, including a bar portion" moved to select "the desired paint size" which further possesses the capability of storing "multiple variants of a formula" and reporting "the previous day's paint usage" (Abstract).

The state of the art currently with regard to the mixing of colorant with base to achieve a paint of a particular color, tone, and shade in accordance with known formulae is considered to be found in the Pantone™ system which is similar to other commercially available systems which identify a large number of colors by a number or code which is correlated to a colorant formula. It is considered that regardless of the system utilized for dispensing colorant for mixing with base in production of standard colors, subsequent colorant dispensement by the local retailer is required in order to achieve a particular color selected by a customer, and the best known means for this is through use of a Pantone™ or equivalent system together with appropriate dispensing equipment which is essentially comprised of at least three nozzles through which metered amounts of a colorant are expelled directly into the standard color paint contained by an open paint can or pail.

With regard to bridging the gap between customer and manufacturer with computer processing and the electronic transfer of information attention to terminology and the applicable context is also emphasized. For example U.S. Pat. No. 5,463,555 for a 'System and Method For Integrating A Business Environment With A Process Control Environment' claims:

A computer-based system for integrating a computerized business system with a computerized manufacturing process, wherein the computerized business system creates a work order containing data specifying a product to be manufactured by the computerized manufacturing system, comprising:

a business systems interface configured to receive the work order from the computerized business system and to extract the data from the received work order; and an event response processor coupled to said business system interface and configured to apply at least one rule to said extracted data to generate one or more setpoints, and to provide said one or more setpoints to the computerized manufacturing system, wherein said one or more setpoints are manufacturing process settings used to manufacture the product. (claim 1)

wherein it must be recognized that when the "computerized business system creates a work order" this event must be triggered by another action which, at some point, must be a human action or else the entire system is autonomous and is of no relation and no use to the world of human beings. The essential point requiring recognition is the fact that the 'Work order' must be the result of a previous human action but that the system disclosed is unconcerned with anything proceeding the computer generation of the work order which is therefore not to be confused with a customer order which is wholly beyond the confines of the system disclosed therein.

Customer orders, in contrast, may be placed with various entities by accessing and utilizing an appropriate web site on the internet. Dell Computer, for example, has achieved substantial commercial success by essentially manufacturing to order computers with features specified by a customer over the internet on a 'visit' to an appropriate web site. Various features are specified from a menu and one of a plurality of options for each feature may be specified. A total price is readily generated by the software after sufficient specification by the on-line customer and an order with Dell readily placed. Payment is made by credit card and the computer, or computer system including peripherals such as a monitor, printer, et cetera, is shipped to the address provided by the customer.

Statement of Need

While various systems, as described above, are known which enable:

(a) specification and ordering of non-paint product such as computers;
(b) computer automated manufacture of standard paints;
(c) addition of colorant by a retailer to a standard paint in accordance with a formula correlated to a number or code identifying a particular non-standard paint color;
(d) selection of a particular non-standard paint color on an internet web site;

the consumer of a liquid coating requiring addition of colorant to a standard paint in order to achieve a particular, non-standard, paint color still must visit a local paint retailer in order to obtain this paint which includes ordering the paint, waiting for the addition of colorant and for mixing the paint, and transport of the paint from the retailer. It is further noted that liquid coating product generally is available only in standard volumes and that there are economic and technical reasons encouraging the purchase of a single standard volume of paint exceeding the amount required.

A need is therefore recognized for the provision of a system which would enable a customer to avoid a visit to a retailer in order to obtain liquid coating product, particularly paint of a particular, non-standard, color, and thereby avoid the time lost in this endeavor. Secondly, it is considered that a need exists for a system which would economically provide liquid coating product in quantities unrestricted by the use of standard volume containers. Thirdly, it is considered that a need exists for a system which would ensure provision of a particular, non-standard, color which is more precise than conventional practice ensuring that independent orders of that color result in paint of a color which is not appreciable different from each other.

SUMMARY OF THE INVENTION

Objects of the Invention

The encompassing object of the principles relating to the instant invention is a system for the direct provision of liquid coating product by a supplier remote to consumers thereof which enables a consumer to place an order directly with the remote supplier for liquid coating product inclusive of a plurality of particular, non-standard, colors.

A first auxiliary objective of the principles relating to the instant invention is a system for the provision by a remote supplier of particular, non-standard, colors of liquid coating product to consumers without the addition of colorant to a standard paint by a local retailer.

A second auxiliary objective of the principles relating to the instant invention is a system for the provision by a remote supplier of each of a plurality of a particular, non-standard, colors of liquid coating product on different occasions to consumers which will not vary appreciably in color.

A third auxiliary objective of the principles relating to the instant invention is a system for the provision by a remote supplier of liquid coating product to consumers in a continuous range of volume unrestricted by the use of standard volume containers.

A first ancillary objective of the principles relating to the instant invention is a system for the provision by a remote supplier of liquid coating product to consumers which allows a consumer to select from a visual display of a plurality of particular, non-standard, colors of liquid coating product.

A second ancillary objective of the principles relating to the instant invention is a system for the provision by a remote supplier of liquid coating product to consumers which provides product information to a consumer and preferably allows a consumer to input linear dimensions for the area to be covered and receive an output in volummetric units.

Other ancillary objectives of the principles relating to the instant invention include a system for the provision by a remote supplier of liquid coating product to consumers which minimizes inventory, is efficient of labor and transport and is hence reliable and economic.

Principles Relating to the Instant Invention

In order to achieve the objects listed above it is first recognized that a system in accordance with the principles relating to the instant invention essentially eliminates the local retailer of liquid coating product by eliminating both: the need for a customer to visit a retailer to obtain such product; and the variables introduced by the addition of colorant and mixing of paint by a local retailer. In essence it is necessary to provide a system whereby the customer may deal directly with a remote supplier of liquid coating product including paint of particular, non-standard, colors and select, order, and obtain said product without having to visit a local retailer.

In this regard it is first recognized that the colorant dispensing apparatus utilized by a manufacturer is generally more accurate, more precise, and more efficient of labor than the colorant dispensing apparatus available to local retailers. Secondly, it is recognized that computer automated systems for manufacturers facilitative of batch processing and storing detailed information regarding the product are not readily applicable to local retailers for much the same reason that better dispensing apparatus is unsuited to use by a local retailer. Elimination of the local retailer in the provision of containerized liquid coating product such as paint, primer, stain and varnish, most significantly from the standpoint of a rational business method, eliminates the inventory held by these retailers which benefit alone provides a more economic system than previously known.

Elimination of local retailers of liquid coating product requires direct communication between consumer and supplier. This may be accomplished by telecommunications such as telephone or facsimile transmission but use of the internet is specifically recommended in fulfillment of the principles relating to the instant invention because of various additional benefits enabled thereby such as providing information about product including representation of particular, non-standard, paint colors. If the consumer knows precisely the product desired an order may readily be placed using telephone or facsimile transmission which is as fast as electronic communication via the internet. However, in addition to providing information useful in selection of product by the customer, use of the internet also facilitates the placing of an order without need for human assistance.

Voice recognition means for converting a telephonic order into a suitable digital signal for input into a computer or scanning of facsimile transmissions ostensibly could provide this capability but either is considered far more difficult to implement than an internet based ordering subsystem. Therefore, while a system in accordance with the principles relating to the instant invention requires direct communication between consumer and remote supplier for the purpose of selecting the product and placing an order, and it is recognized that this may be effected with use of conventional telecommunication, i.e. telephone or facsimile transmission, it is preferred that an ordering subsystem be internet based in order to facilitate reception of digital orders by a computer.

In order for a remote supplier to efficiently fulfill direct customer orders computer control of the production is further considered advantageous. The supplier must possess the capability of efficiently performing the service conventionally supplied by local retailers and must therefore be able to track large numbers of independent direct customer orders and coordinate the activities required in timely fulfillment of the same. Batch processing may be useful but the production subsystem is not necessarily concerned with the manufacture of known volumes of standard color paint, though this may be additionally included, but with the production of numerous, diverse, specific quantities of particular, non-standard, colors of liquid covering product in fulfillment of specific customer orders.

It is recommended that production be as largely computer automated as possible and that every customer order be associated in computer memory with the containers utilized in fulfillment of each order. This may be assisted with the use of labels bearing a bar code which may be read by a bar code scanner or more simply with a label bearing information identifying the customer order and preferably containing all the customer order information such as customer name, delivery address, order and delivery dates, and the type, quantity, and number of containers of each liquid covering product comprising the order. Rather than relying exclusively upon bar codes and scanners it is suggested that labels bearing all this customer order information be attached to appropriate containers and further that an indication be made on the label or elsewhere on the container of the precise contents disposed therein, and preferably only as a result of the disposition of that content therein. This practice is considered to provide a quality control assurance superior to that obtainable with any system relying upon a bar code label alone upon the containers.

Delivery of the liquid coating product requires transit of the same from the remote supplier directly to the address specified by the customer. This may, conveniently for the customer, be the work site if ordered by a contractor or the home of the 'weekend painter'. While there is necessarily a time delay for transport the customer can be given a delivery date at the time of ordering and commercial shipping or transport services such as United Parcel Service are recommended. The delivery date does not necessarily need to be exact but is preferably the date by which delivery is promised. Express delivery can be available for an additional charge. Production dates based upon the anticipated time required of the delivery and the delivery date are recommended as part of the information clearly indicated upon each container utilized for fulfillment of the order.

Rather than relying upon a bar code for tracking production it is suggested that product be grouped by customer order and that batching reflect time and geography, i.e. be determined by delivery date and address, in facilitation of shipping. Batching by type of product base and production date is recommended in commencement of production. Inventory of standard color liquid covering product is assumed unless production is inclusive of manufacturing standard product and this production is further integrated with production of particular, non-standard, colors.

It is not recommended that this inventory be keep in the form of conventional, consumer size, containers, e.g. gallon paint cans, but rather it is suggested that inventory of standard liquid coating product from a manufacturer be maintained in fifty-five gallon barrels or other comparatively large containers such as 1,000 liter 'totes' so that dispensing of both the standard product and the colorants required in production of product possessing particular, non-standard, colors may be effected by the same production line. Tanks sufficient to contain the content of a full tanker trailer or railroad tank car are suggested, connected by pipeline to appropriate dispensing machines in the production line. Regardless of the standard liquid covering product, i.e. base, inventory maintained by the producer, it is considered prudent to first batch production by the type of base and the production date.

It is secondly suggested that production be batched by shipment date and geographic area for delivery and that containerized product comprising specific orders be grouped together preferably during or before shipment batching. Batching by base material, delivery, and specific order are each hence recognized which are all further correlated to time with production, delivery and order dates. A production subsystem in accordance with the principles relating to the instant invention hence receives information from the ordering subsystem and is used to govern production in fulfillment of the orders preferably with the use of a computer and utilizing these three types of batching.

While standard volume containers are of obvious utility to a production process which maintains inventory of standard color liquid coating product it is desired to essentially eliminate both inventory of, and the need to open, sealed containers in order to add colorant in fulfillment of an order for a particular, non-standard, color liquid covering. While requiring considerable flexibility, it is considered that a production process exclusively responsive to customer orders enables maximum efficiency as inventory is eliminated and every container is run through the production process just once. Given sufficient flexibility of the production equipment, which essentially requires computer control of the same with sufficient sophistication to recognize each specific task as dedicated to fulfillment of a particular customer order, non-standard containers may readily be utilized.

More specifically, while a set number of standard maximum volume containers is considered as a practical necessity, it is not necessary that each container be fully filled nor that rigid cylindrical containers possessing a resealable lid be utilized. Standard paint cans of one gallon size might be utilized exclusively, for example, with partial filling of one paint can per order as required to yield the precise volume ordered. And because it is not necessary to open a sealed container for addition of colorant by a local retailer other types of containers may be utilized. Flexible, expansible, plastic containers which are permanently sealed may be utilized which are less expensive than conventional paint cans, especially for smaller volumes, and the fact that the content was specifically produced to order emphasized thereby in reassurance to the customer that the order placed has been correctly fulfilled. Product samples comprised of a volume less than a pint are further enabled.

The fact that the remote supplier of the liquid covering product is adding all the colorants required of particular, non-standard, color paint means that a precision in mixing such colors greater than that known in conventional paints customized by a local retailer are readily obtained. The liquid covering product may therefore possess a consistency with regard to color, tone and shade which will ensure that the same color product ordered on different occasions will not be appreciably different. If a customer used a given paint on one occasion and decided later to use the same color in another application or in refinishing the first application they may simply place another order for that paint or even ask the supplier for identification of the paint used previously in a subsequent order. The computerized ordering subsystem preferably possesses memory in which all order information is retained and retrievable by use of various indices including customer name and address.

It is further preferred that the ordering subsystem provide product information to the consumer including representation of particular, non-standard, paint colors, base characteristics, and pricing, and that this information be available by accessing an internet web site. Means for placing an order is necessary and is inclusive of a method of payment. Credit account of various types are suggested including input of credit 'card' numbers or direct accounts with the supplier. Assistance in selection of order quantity is recommended whereby a customer may input dimensional information regarding the surface area to be covered and an appropriate volume is outputted. Selection may be further assisted with input of type of usage e.g. interior or exterior, bathroom or kitchen versus other interior surfaces, et cetera. With appropriate software supporting an internet web site the consumer may provide digital input including video, photographic, and solid modeling representations of furnishings within rooms thereby providing spatial and color inputs which may be utilized to generate one or more suggestions of a particular color for the surfaces intended to be covered.

Lastly, while an internet web site for digital input into the ordering subsystem is preferred and is considered to best enable direct placement of orders by a consumer with the remote supplier it is also suggested that a kiosk located terminal either connected to the internet, preferably with access limited to the remote supplier's web site, or with a direct line to the remote supplier ordering subsystem, may be utilized in fulfillment of the principles relating to the instant invention. While such a kiosk located terminal would be preferably located upon the premises of a local retailer and the consumer obviously has visited the same the consumer does not rely upon the capabilities of the local retailer in adding colorant and mixing the same with base in achievement of a particular, non-standard, color and the consumer further does not need to transport the liquid covering product so ordered from a local retailer. It is also noted that an internet based web site may be designed to facilitate access an interaction by a portable, hand held, internet device using radio frequency signal transmission and reception with a public broadcast exchange (PBX).

Figure 1:
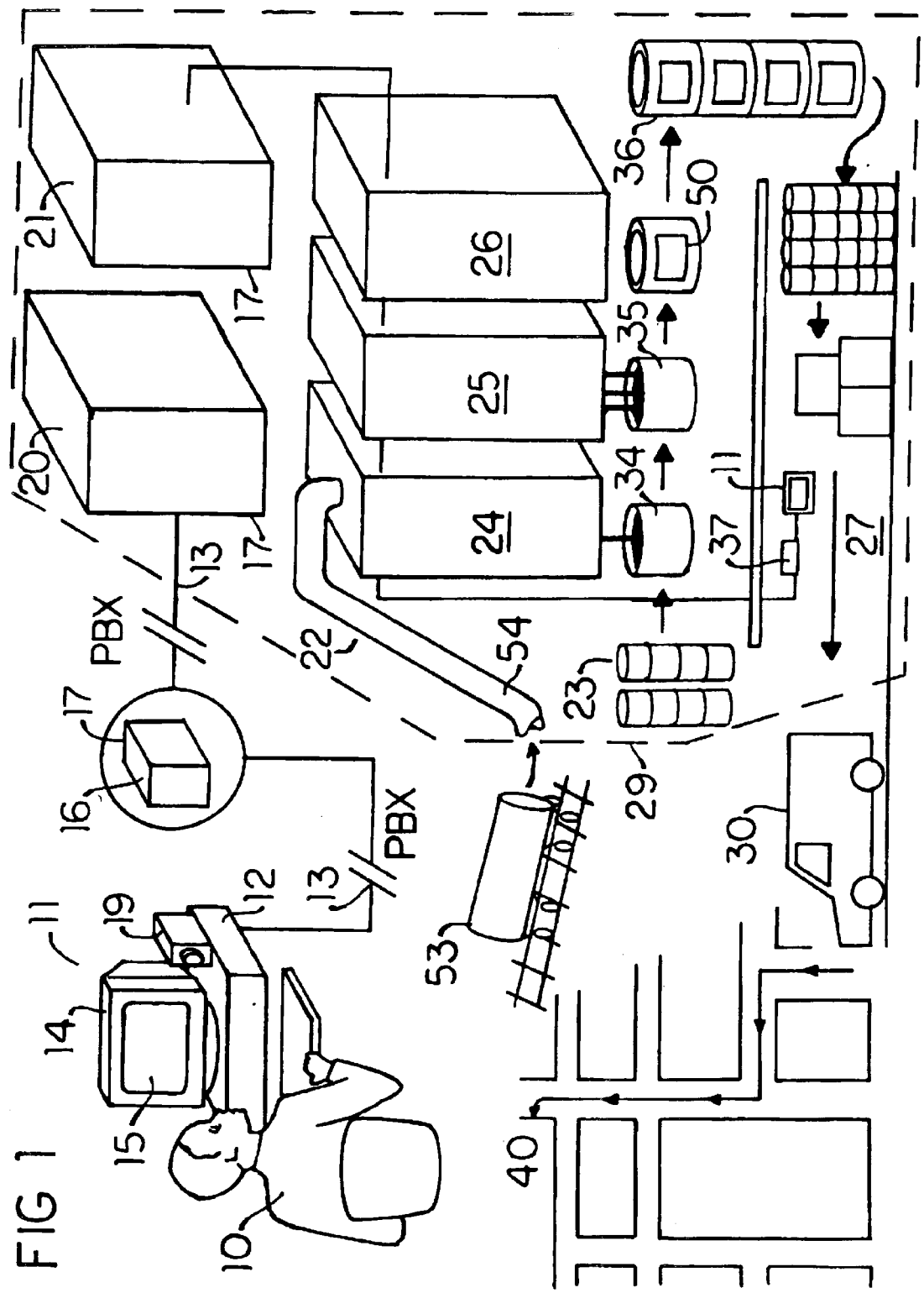
FIG. 1 is a schematic representation of a preferred liquid coating product supply system in accordance with the principles relating to the instant invention utilizing a personal computer connected to the internet for consumer direct ordering from a remote supplier.

NOMENCLATURE 10 consumer
11 internet terminal
12 personal computer 13 modem connection
14 computer monitor
15 visual display screen
16 internet web site
17 computer
19 video camera
20 customer order subsystem
21 production subsystem
22 production line
23 container(s)
24 liquid coating base
25 colorant
26 container identifier
27 shipping
29 confines of remote supplier
30 transport
31 dedicated terminal
32 kiosk
33 telephone
34 open container with liquid coating base
35 open container with colorant
36 containerized liquid coating product
37 scanner
39 confines of a local retailer
40 location identified by customer address
41 portable internet device
45 supplier personnel
46 facsimile transmission
47 facsimile reception
50 label
51 customer order information
52 digital code
53 railroad tank car
54 pipe line
55 fifty-five gallon drum
56 empty expansible container
57 full expansible container
59 collar

DETAILED DESCRIPTION OF THE PREFERRED EMBODIMENTS

FIG. 1 depicts a consumer 10, which for purposes of the instant invention is defined as a person who is interested in purchasing containerized liquid coating product including paint, primer, stain, varnish, mastic or other adhesive, et cetera, which requires the addition of colorant in order to achieve a particular, custom, color, in front of and operating an internet terminal 11 depicted therein as comprising a desk top type personal computer (PC) 12 possessing a modern line connection 13 to a public telephone exchange (PBX), a monitor 14 possessing visual display screen 15 upon which an interactive web site 16 comprised of software held by a server computer may be viewed after accessing over the internet. The consumer 10 accesses the web site 16 by inputting an appropriate internet address such as the domain name, which may first be identified with the use of an internet search engine, and is able to select and order upon this web site 16 containerized liquid coating product 36 which requires colorant addition to achieve any one of a plurality of particular, custom, colors which are ether represented upon the visual display screen 15.

The web site 16 provides information sufficient to enable both selection and ordering of containerized liquid coating product including that which requires colorant addition to achieve a particular, custom, color which is conventionally available only from a local retailer and which is unavailable from a manufacturer of such product. This infromation preferably identifies and describes liquid coating base 24 characteristics wherein the base material is a liquid coating product of standard color which is generally available to local retailers from a manufacturer or distributor intermediary to the two. Liquid coating base 24 characteristics are determined by the use of oil, water, latex, and polymer compositions and are readily described as suited to various exterior and interior applications wherein both the surface and the environment conditions are readily recognized as criteria for determining suitability.

Oil based liquid covering product 36, for example, is generally considered as superior for exterior and severe environment applications while water based latex liquid covering product 36 is generally preferred for interior applications of less than severe environments. Liquid coating bases 24 are also typically characterized by the resulting dry finish, e.g. gloss, semi-gloss, and flat, which are generally associated with composition and the environment suitable. Flat finishes are typically preferred for interior and exterior wall while semi-gloss or gloss is typically preferred for trim. Bathrooms and kitchens are considered to be moderately severe environments for which semi-gloss polymer and oil based paints are considered suitable for walls. Water based liquid coating bases 24 are generally less expensive and easier to use than oil based liquid coating bases 24.

For the purposes of the instant disclosure it is recognized that a variety of liquid coating bases 24 are available in a relatively restricted number of standard colors from the manufacturer and that the performance of a liquid coating product 36 and hence the suitability of the same for covering a given surface depends upon the composition of the liquid coating base 24. The surface is quite relevant to suitability. An unfinished drywall surface is generally considered to require a water based primer prior to application of the water based finish liquid coating while the same may be used on unfinished wood trim though oil bases are generally considered to be superior to water bases and unfinished metal is generally considered to require an oil based primer prior to application of an oil based finish coat. Walls are far more quickly covered with the use of a roller than a brush and if water based liquid covering product 36 is used the rollers may readily be cleaned and used again while this is generally considered impractical with an oil based liquid covering product 36 which is generally more difficult to clean up as requiring a solvent other than water.

The application, therefore, is of large importance to proper selection of an appropriate liquid coating product 36 and it is considered that information regarding the same preferably be available on an internet web site 16 which may further allow a consumer 10 to input information regarding the application, e.g., location and surface condition, which the software comprising the web site 16 may readily use as a guide for recommending liquid coating bases 24. The expense of any liquid coating product 36 is further determined largely by the liquid coating base 24, regardless of the particular, custom, color selected.

While selection of an appropriate liquid coating base 24 may be largely sufficient for the selection of an appropriate primer which will be completely obscured by the finish coat, and may similarly be largely determinative of substantially transparent liquid coating product 36 such as varnish, as well as being determinative of adhesives such as mastic which are covered by another surface such as tile, the most important characteristic of the finish coat obtained with the application of a liquid coating product 36 for most people is generally considered to be the color which is endlessly variable and invariably obtained by the addition of varying quantities of different colorants 25. The ability of a consumer 10 to select from a large number of different colors and order liquid coating product 36 of a particular, custom, color directly from a supplier without having a local retailer open a container of standard color paint, add colorant 25, and thoroughly mix the resulting paint which the consumer 10 must then transport from the local retailer is considered fundamental to the benefits derived from a fulfillment of the principles relating to the instant invention.

Another aspect considered important to an average consumer 10 is the appropriate quantity. A can of paint may specify a coverage range in square feet but this may be beyond the comprehension of the novice or less mathematically inclined consumer 11. While area in square feet is simply the product of the two relevant linear dimensions for a rectangular area, and most walls are rectangular, the actual usage is also dependent upon other factors such as temperature, which affects the viscosity of liquid coating product 36 and hence the thickness of the coat applied; and the quality of the surface to coated. A given area of concrete block wall, for example, will require far more liquid coating product 36 than a drywall surface of the same area. The method of application is also relevant. Application with a brush is inherently more efficient than with a roller which absorbs liquid coating product 36 which cannot effectively be retrieved and also requires a pan which retains unusable residue. If a consumer 10 intends to paint an apartment with the help of friends on a weekend, for example, the number of people using rollers for the application of the same liquid coating product 36 will affect the quantity effectively required. In this case the consumer will likely be more concerned with having a sufficient quantity than in usage efficiency.

Alternatively, while the consumer 10 may generally be assumed to desire ordering a sufficient volume of liquid coating product 36 for a given job, the volume left over is generally wasted and comprises an inconvenience in addition to needless expense. This is considered especially relevant if the liquid coating product 36 is of a particular, custom, color which was selected for a specific application and is considered useless for any other application in the foreseeable future. For all of these reasons it is considered a great benefit to the consumer 10 to be able to accurately determine the volume of liquid coating product 36 appropriate to a given application and assistance in the same which preferably accounts for as many factors as feasible is hence considered beneficial for which reason an internet based web site 16 is considered the best means of both providing information about liquid coating product 36 and assisting in the selection of both a particular, custom, color and a suitable volume of the same for a given application.

Figure 3:
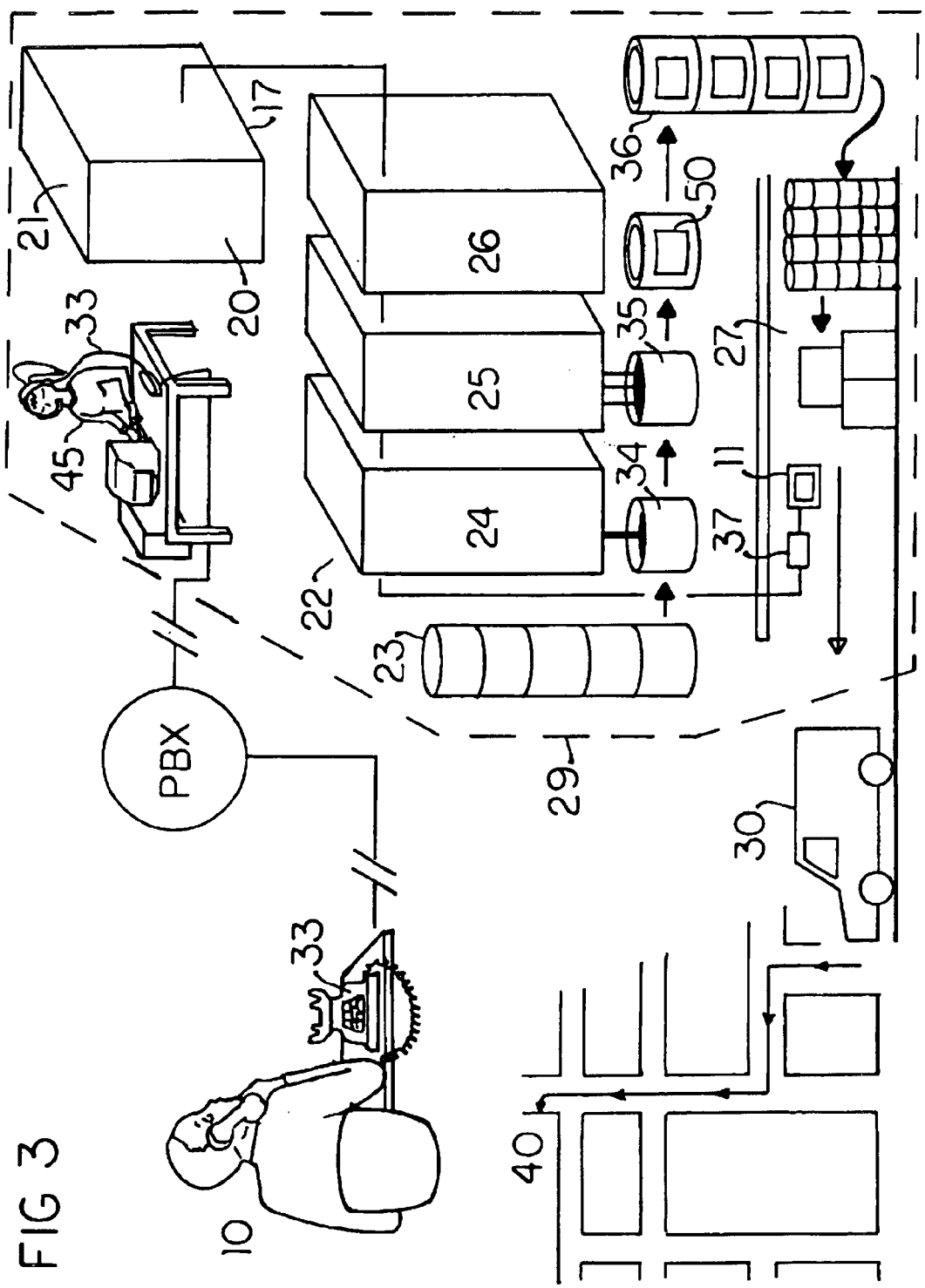
FIG. 3 is a schematic representation of a preferred liquid coating product supply system in accordance with the principles relating to the instant invention utilizing a telephone for consumer direct ordering from a remote supplier.
Figure 4:
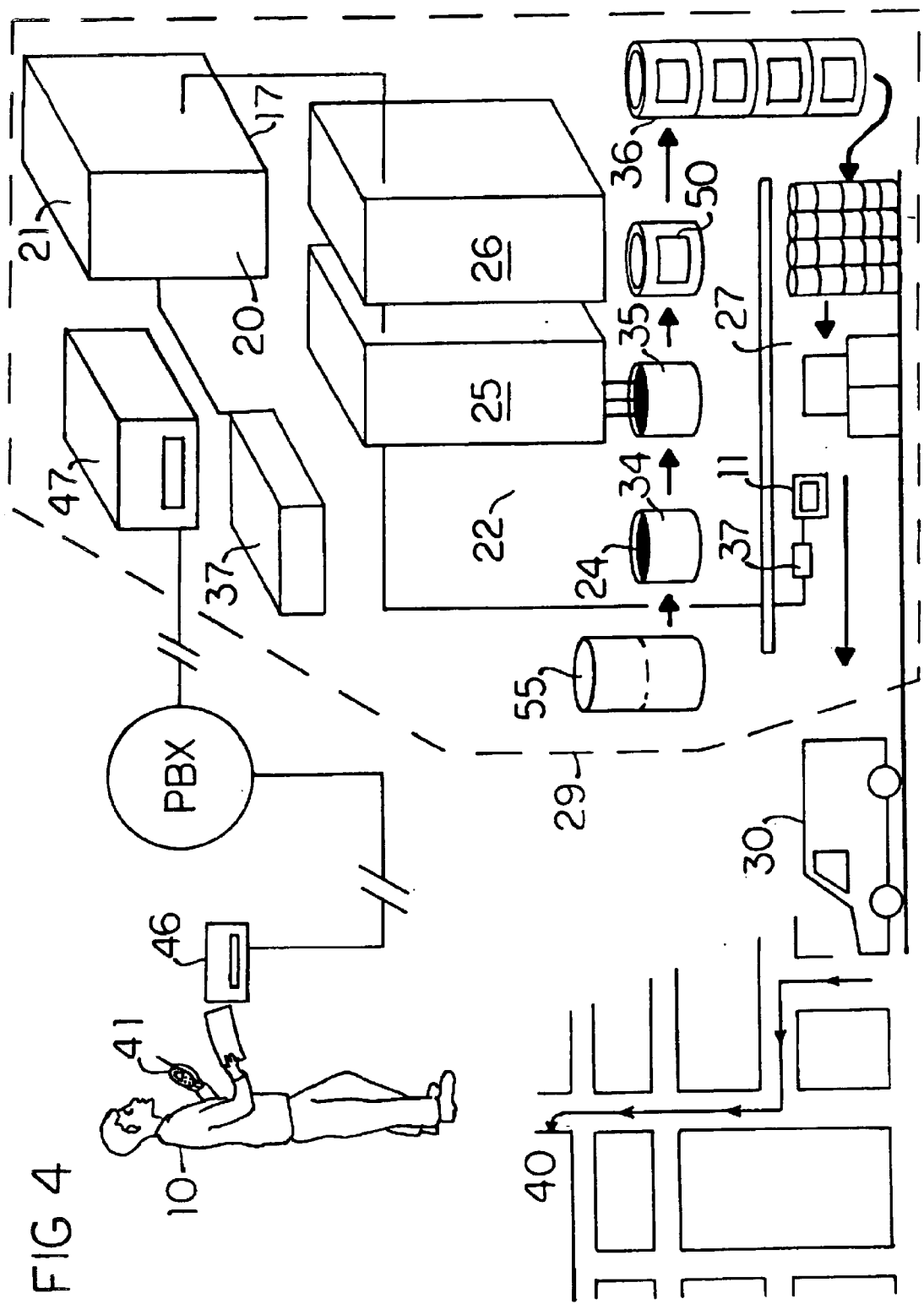
FIG. 4 is a schematic representation of a preferred liquid coating product supply system in accordance with the principles relating to the instant invention utilizing facsimile transmission for consumer direct ordering from a remote supplier.

As a final example of the advantages available through use of an internet based web site 16 as the means for ordering liquid coating product 36 directly from a supplier, as represented in FIG. 1 and in contrast to a telephonic or facsimile transmission ordering as represented in FIGS. 3 & 4, it is mentioned that the consumer 10 equipped with a video camera 19 operably connected to a personal computer 12 possessing a modem connection 13 to a PBX may use the same to provide visual information to an internet based web site 16 including color images of the furnishings in a given room. Similarly, photographs of a room including furnishings are easily scanned and the digital representations easily provided by the consumer 10 through a personal computer 12 possessing a modem connection 13. And solid modeling of a room with furnishings which may be colored are also easily provided as digital input. Appropriate software comprising the web site 16 in this case will receive digital input from the consumer 10 and provide information to assist in product selection and may suggest one or more particular, custom, colors for the liquid coating product 36 for ordering by the consumer 10. With a suitable dimensional reference, such as a yardstick disposed flush against a wall for example, the software comprising the web site 16 may further estimate the area to be covered and recommend a suitable volume as well.

Figure 2:
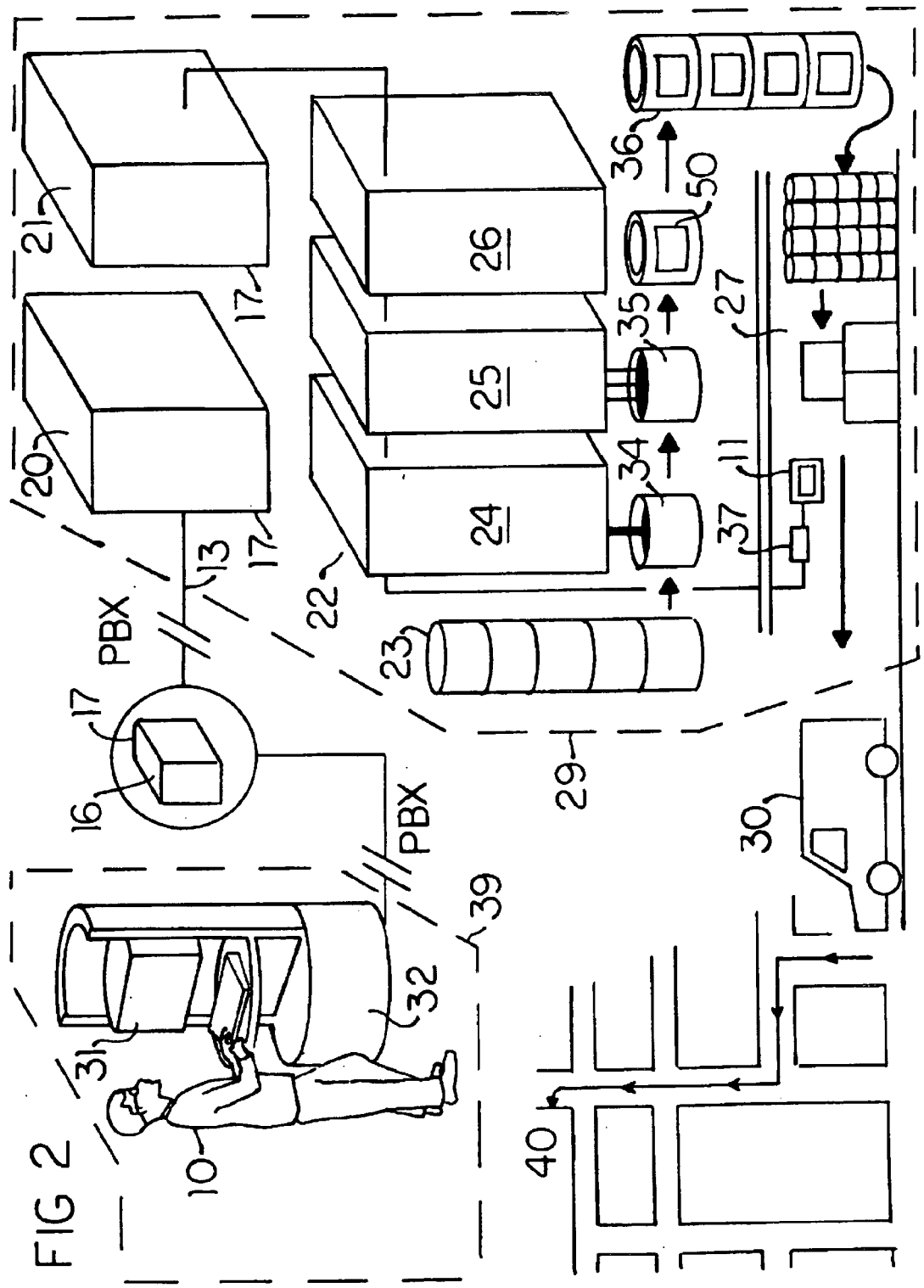
FIG. 2 is a schematic representation of a preferred liquid coating product supply system in accordance with the principles relating to the instant invention utilizing a kiosk terminal connected to the internet for consumer direct ordering from a remote supplier.

Regardless of the means utilized for selection and ordering of liquid covering product 36 a customer order must identify the quantity of each, a delivery address, and preferably a delivery date. This comprises information which is entered into a customer order subsystem 20 maintained by a supplier which is remote to the consumer 10. As represented in FIGS. 1 & 2 the customer order subsystem 20 is preferably comprised of software run by a computer 17 possessing an operable internet modem connection 13 with a PBX. In this case the web site 16 is assumed to be comprised of different software run by a server computer 17 maintained by an Internet service provider which is different that the computer 17 running the software comprising the customer order subsystem 20 though this is not strictly necessary. The two sets of software might be one and the same with the server computer 17 maintaining the web site 16 also maintaining the customer order subsystem 20 or vice versa. In any case the two sets of software are preferably integrated to a degree which at minimum enables a consumer 10 to place an order and the remote supplier to obtain the information necessary to fulfill that order. The software comprising the web site 16 and the customer order subsystem 20 is effectively the same with this regard but it is also recognized that it is undesirable to have direct public access to the computer systems maintained by the supplier and the desirability of one or more firewalls erected against unwanted intrusion argues for the use of different software running on different computers 17 for the web site 16 and the customer order subsystem 20.

Similarly, while it is quite feasible to maintain both a customer order subsystem 20 and a production subsystem 21 on the same computer 17 and with the same software, it is considered desirable to separate the two subsystems 20, 21 with a firewall which, ideally, means that there is no direct line connection between the two. The customer order subsystem 20 preferably possesses a modem connection 13 with a PBX in order to receive orders through the internet. This means that the computer 17 running the software comprising the customer order subsystem 20 is vulnerable to unwanted intrusion by the public and while various measures are available and currently being developed it is considered impossible to guarantee imperviousness to undesired intrusion by the public into any computer 17 possessing an open modem connection 13 operably connected to the internet.

For this reason it is considered desirable to separate a computer 17 based customer order subsystem 20 from a computer 17 based production subsystem 21 despite the need for information transfer between the two. The production subsystem 21 ideally governs the production line 22 in order to achieve automation and flexibility in the same. Input data comprising appropriate customer order information 51 (FIG. 5) is preferably utilized in two coordinated ways with regard to the production line 22. It is suggested that the order data be compiled and processed into parameters governing production in achievement of batching with respect to the use of liquid coating base 24 which is preferably disposed into empty containers 23, as depicted in FIGS. 1. 2& 3 and implied in FIG. 4. Batching is also recommended for the addition of colorant 25 in achievement of particular, custom, colors and it is specifically suggested that customer order information 51 be transferred, in coordination with batching, onto each open container with colorant 35, in identification of the content therein preferably including the customer name, delivery address, delivery date, and volume of each liquid coating product 36 and the number of containers 23 utilized in fulfillment of each order.

As shown in FIGS. 1–4 the containerized liquid coating product 36, preferably carrying a label 50 with the customer order information 51 detailed above clearly printed thereon and or a bar or other digital code 52 by which such information may be readily retrieved by a scanner 37, is transferred from the end of the production line 22 to shipping 27 from which it is then taken by suitable transport 30 to the location identified by the customer delivery address 40. Shipping 27, represented simply as an area within the confines of the remote supplier 29, preferably comprises an area in which orders are assembled and packaged for delivery 'pick-up' by a commercial transport 30 service and wherein batching by order and delivery date is preferably observed. For this purpose and for effecting a change in status, both in receipt from the production line 22 and in shipment of the order, in the production subsystem 21 shipping 27 preferably possesses a computer monitor 14 with a direct line connection to the computer 17 in which the production subsystem 21 is maintained and operated.

With regard to the preferred embodiments of the principles relating to the present invention represented in FIGS. 1–4 considered in contrast it is first noted that rather than utilizing an internet terminal 11 comprised of a PC 12 with an internet modem connection 13 and associated computer monitor 14 as represented in FIG. 1 the consumer 10 in FIG. 2 utilizes a dedicated terminal 31 located at a kiosk 32 which is preferably located within the confines of a local retailer 39. The dedicated terminal 31 is wired so that only the web site 16 maintained in representation of the remote supplier is accessible. In this case there is hence effectively no internet and the functioning of the single accessible web site 16 maintained on a internet server computer 17 may effectively be assumed by the computer 17 also maintaining the customer order subsystem 20 within the confines of the remote supplier 29. As represented in FIG. 3 the consumer 10 utilizes a telephone 33 to place an order with supplier personnel 45 and in FIG. 4 the consumer places an order by facsimile transmission 46 and the order is received by the remote supplier with facsimile reception 47 while in the left hand of the consumer 10 a portable internet device 41 is held which may also be utilized for the placement of an order via a web site 16 which is represented in FIGS. 1 & 2.

The production line 22 of the preferred embodiments of the principles relating to the present invention represented in FIGS. 1–4 also vary and the varying components interchanged. As represented in FIG. 4 open containers 34 filled with liquid coating base material 24 obtained directly from a manufacturer may be utilized though it is preferred that more economic volumes such as a fifty-five gallon drum 55 or 1,000 liter 'tote' be obtained from a manufacturer in which case empty containers 23, represented in the other figures, of suitable size for customer order fulfillment will also be required.

In FIG. 1 a railroad tank car 53 is represented from which liquid coating base 24 is transferred via a pipe line 54 into a tank in the production line 22 for dispensing into empty containers 23. In FIGS. 2 & 3 empty containers 23 are similarly filled with liquid coating base 24 by the first dispensing unit in the production line 22 which in all cases proceeds with the dispensing of colorant 25 into an open container 34 with liquid coating base 24 thus achieving an open container with colorant 35. It is commented that the use of a dedicated terminal 31 located in a kiosk 32 within the confines of a local retailer 39 is considered especially appropriate for a remote supplier which is also a manufacturer and the step of filling empty containers 23 with liquid coating base material 24 may in this case more specifically comprises the addition of constituents of the liquid coating base 24 including solvent and binder from tanks holding each constituent separately.

It is also noted, with respect to all the preferred embodiments of the principles relating to the present invention as represented in FIGS. 1–4, that the opening and closing of the containers 23, as well as the blending of the contents therein resulting in the containerized liquid coating product 36 is assumed in each production line 22 and that it is preferred that closure of the open containers 35 after the addition of any colorant 25 to the open container 34 filled with liquid coating base 24 be coordinated with the operation of a container identifier 26 which is represented as the addition of a label 50 upon the open container with colorant 35. It is further preferred that the container identifier 26 be controlled in coordination with control of the addition of the colorant 25 and the liquid coating base 24 by the production subsystem 21 as indicated by the direct lines between these but that the feedback data from the filling operations be utilized to ensure that the container identifier 26 operates accurately. As a further quality control measure a spectrophotometer or colorimeter may be employed to test the color of the contents of the open container with colorant 35 prior to operation of the container identifier 26 and closure effecting containerized liquid coating product 36.

As further represented in FIG. 4, the consumer 10 is placing an order by facsimile transmission 46 through a PBX and the order is taken by facsimile reception 47 and converted into digital format with the use of a scanner 37 which also enters the order including customer order information 51 into a single computer 17 operating both the software comprising the customer order subsystem 20 and the software comprising the production subsystem 21. This is also the case represented in FIG. 3. In both cases entrance of customer order information 51 into the customer order subsystem 20 is preferably performed with the aid of supplier personnel 45 as represented in FIG. 3. While this is considered inferior to use of the internet through a web site 16 maintained on an internet server computer 17 as described above as being comparatively labor intensive since the computer 17 running the software comprising the customer order subsystem 20 does not require an open modem connection 13 it is not vulnerable to undesired intrusion there is no need to separate the production subsystem 21 from the customer order subsystem 20.

Figure 5:
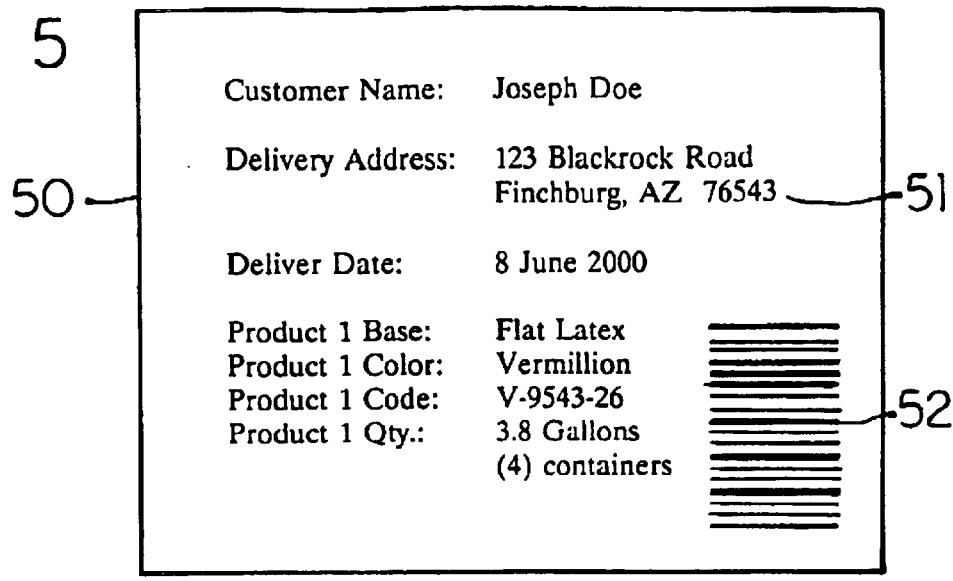
FIG. 5 represents an exemplary label for attachment to a container holding liquid covering product ordered directly from a remote supplier by a consumer bearing information identifying the contents and other customer order information.
Figure 6:
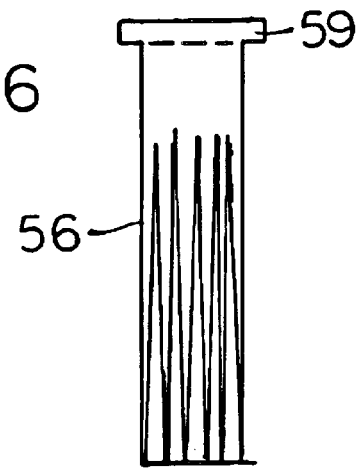
FIG. 6 is a plain elevational view taken from the side of an empty expansible liquid product container molded in plastic.
Figure 7:
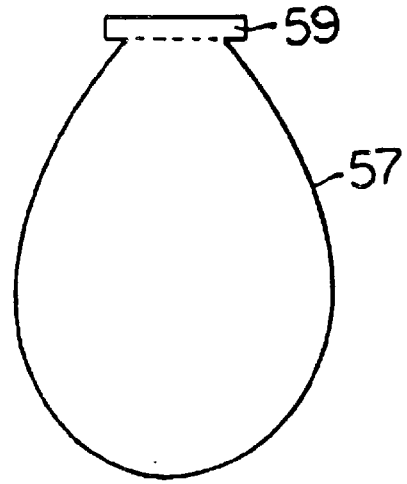
FIG. 7 is a plain elevational view taken from the side of a full expansible liquid product container molded in plastic.

FIG. 5 depicts a label 50 bearing customer order information 51 which is preferably, as shown, inclusive of customer name, delivery address, delivery date, identification of liquid coating base 24 and colorant 25, and both volume and number of containers 23 fulfilling the order. Other information may readily be included such as production date, the number of different containerized liquid coating products 36 comprising the order, the volume and number of containers 23 for the same, et cetera. A bar or other digital code 52 is also suggested which is readily read by a scanner 37 for verification of customer order information or retrieval of the same. Use of only a bar or other digital code 52 without textual printing of any customer order information 51 is not particularly recommended though it is certainly considered feasible, particularly if the service utilized for transport 30 is equipped with a system which can readily scan and read the customer name and delivery address at FIGS. 6 & 7, respectively, depict an empty expansible container 56 in a collapsed condition intended for filling with liquid coating base 24 and colorant 25 in the production of containerized liquid coating product 36 in the resulting full expansible container 57. An embodiment of the principles relating to the present invention utilizing such an expansible container 56, 57 preferably has preblended liquid coating base 24 dispensed from a tank with the use of a mechanism for gripping a collar 59 about an aperture in conveyance of the empty or full expansible container 56, 57. Because colorant 25 is added by the supplier and delivered directly to the consumer 10 and there is no need for reopening the full expansible container 57 after production in the form of containerized liquid product 36, it is considered advantageous economically to utilize expansible containers 56, 57 molded of flexible plastic as opposed to conventional rigid metal paint cans or rigid plastic pails for containerization. Especially for smaller volumes it is further considered that an empty expansible container 56 molded of flexible plastic which is essentially an envelope and readily folded flat prior to filling may be heat sealed and then shaken in mixing after the addition of colorant 25 in production of the containerized liquid coating product 36. Alternatively, a resealable closure such as a threaded collar 59 and mating cap may be utilized. In either case the full plastic container 57 is not readily suited to use directly and it is anticipated that the liquid coating product 36 contained therein will require transfer to another rigid container 23 for use and while this is considered a disadvantage in one regard it is also considered good practice generally in application of liquid coating product 36 and making the container 23 rigid would largely negate the economy achieved in the use of a flaccid plastic expansible container 56, 57 of the type depicted in FIGS. 6 & 7.

The foregoing is intended to provide one practiced in the art with what is considered to be the best known manner of making and using a system in accordance with the principles relating to the present invention and is not to be interpreted in any manner as restrictive of that invention or the rights and privileges obtained by Letters Patent for which I hereby claim:

1. A method for the direct supply for containerized liquid coating product inclusive of a customized color to an ultimate consumer of the liquid coating product by a supplier remote from the ultimate consumer thereby enabling bypassing of local retailers, said method comprising the steps of:

accepting, over a computer network through an internet website from at least one ultimate consumer, a customer order placed directly with a remote supplier specifying customer order information including indication of a liquid coating base, a color, a quantity, delivery address and identification of the ultimate consumer;

entering said customer order information into a customer order subsystem comprised of software maintained on a computer;

compiling said customer order information with a computer and processing the results of this compilation with a production subsystem to yield production parameters;

operating, in observance of said production parameters yielded by said production subsystem, a containerized liquid coating production line for producing in a single batch a customer specified non-standard quantity that is a fractional portion or an uneven multiple of gallons, quarts, pints, and liters in any customizable color with the addition of colorant to liquid coating base in precision quantities;

fractionally filling a container with the customer specified non-standard quantity of liquid coating base;

adding colorant for color customization to the liquid coating base in precise amounts corresponding to the non-standard quantity of liquid coating base, where the precise amounts are added in proportion to said non-standard quantity;

assembling containerized liquid coating product resulting from said production line fulfilling at least one individual customer order and packaging the resulting assemblage as required for shipment to the customer; and causing the transporting of each said assemblage of containerized liquid coating product fulfilling each said customer order to the delivery address specified by the ultimate consumer in placing the customer order;

whereby each said ultimate consumer obtains delivery of a customer specified quantity and color of containerized liquid coating product directly to a specified address in accordance with said customer order information; and wherein the web site provides assistance in the selection of liquid coating product appropriate to a given job as defined by information input by the ultimate consumer.

2. A method for the direct supply for containerized liquid coating product inclusive of a customized color to an ultimate consumer of the liquid coating product by a supplier remote from the ultimate consumer thereby enabling bypassing of local retailers, said method comprising the steps of:

accepting, over a computer network from at least one ultimate consumer, a customer order placed directly with a remote supplier specifying customer order information including indication of a liquid coating base, a color, a quantity, delivery address and identification of the ultimate consumer;

entering said customer order information into a customer order subsystem comprised of software maintained on a computer;

compiling said customer order information with a computer and processing the results of this compilation with a production subsystem to yield production parameters;

operating, in observance of said production parameters yielded by said production subsystem, a containerized liquid coating production line for producing in a single batch a customer specified non-standard quantity that is a fractional portion or an uneven multiple of gallons, quarts, pints, and liters in any customizable color with the addition of colorant to liquid coating base in precision quantities;

fractionally filling a container with the customer specified non-standard quantity of liquid coating base;

adding colorant for color customization to the liquid coating base in precise amounts corresponding to the non-standard quantity of liquid coating base, where the precise amounts are added in proportion to said non-standard quantity;

assembling containerized liquid coating product resulting from said production line fulfilling at least one individual customer order and packaging the resulting assemblage as required for shipment to the customer; and causing the transporting of each said assemblage of containerized liquid coating product fulfilling each said customer order to the delivery address specified by the ultimate consumer in placing the customer order;

whereby each said ultimate consumer obtains delivery of a customer specified quantity and color of containerized liquid coating product directly to a specified address in accordance with said customer order information.

* * * * *